United States Patent [19]

Wallace

[11] Patent Number: 4,642,460
[45] Date of Patent: Feb. 10, 1987

[54] TECHNIQUE FOR LOCATING INJECTED GAS IN OIL BEARING FORMATIONS BEHIND CASING

[75] Inventor: James P. Wallace, Plano, Tex.

[73] Assignee: Mobil Oil Corporation, New York, N.Y.

[21] Appl. No.: 686,807

[22] Filed: Dec. 27, 1984

[51] Int. Cl.$^4$ .............................................. G01V 5/10
[52] U.S. Cl. .................................. 250/256; 250/266; 250/269
[58] Field of Search ............... 250/256, 265, 266, 269

[56] References Cited

PUBLICATIONS

Marvin R. Neal, "Gravel Pack Evaluation", *Journal of Petroleum Technology* (Sep. 1983), pp. 1611–1616.

*Primary Examiner*—Janice A. Howell
*Assistant Examiner*—Constantine Hannaher
*Attorney, Agent, or Firm*—Alexander J. McKillop; Michael G. Gilman; George W. Hager, Jr.

[57] ABSTRACT

A method for monitoring the movement of injected gas in an oil bearing formation behind the well casing is disclosed. A compensation neutron log is obtained from the well. The count rates are normalized to delineate water zones, gas zones and shale zones. Near and far count rates are rescaled and used to provide a qualitative determination of the distance from the point of injection to the top of the displaced gas in the formation by an analysis of the separation of the near and far count rate curves.

1 Claim, 9 Drawing Figures

TECHNIQUE FOR LOCATING INJECTED GAS IN OIL BEARING FORMATIONS BEHIND CASING

BACKGROUND OF THE INVENTION

Production of hydrocarbon fuels presently takes many forms. Often, oil wells that have been abandoned previously due to pressure loss are the subject of secondary or tertiary recovery. In some systems, a compressed gas is injected into the oil well to force liquid hydrocarbons into a recoverable position in subsurface formations and to provide reservoir pressure. It is desirable, when injecting gas within an oil bearing formation, to monitor the movement of gas with time. Ideally, this should be accomplished with minimal cost and shut-down time.

Methods that are in practice today include the evaluation of porosity computed from the compensated neutron and/or water saturation computed from a pulsed-neutron log. Neutrons have no electrical charge and have a mass very close to that of a proton. Since there is no ordinary electrostatic repulsion or attraction, a neutron will undergo collision only rarely. A direct hit on an electron or a nucleus must occur before a neutron is detected.

A neutron can interact with other particles in two ways, depending upon the energy of the neutron and the nucleus involved. In the first type, low energy neutrons ($<0.025$ eV) are captured by a nucleus, increasing its internal energy and immediately releasing this energy in the form of gamma radiation. One can identify the capture nucleus by the pattern of its released gamma radiation. Pulsed-neutron logging utilizes this method.

The second type of neutron interaction is called scattering. There are two types of potential collisions which a neutron may have, inelastic and elastic. Inelastic scattering takes place when the neutron is highly excited ($>100$ eV). This most commonly occurs early in the neutron's life. This type of scattering transfers both kinetic and internal energy from the excited neutron to the target nucleus.

Elastic scattering is the primary mechanism by which the neutron loses energy. The loss of energy from the neutron to the nucleus is in the form of kinetic energy. The neutron will continue to collide with various elements until it decelerates to its lowest energy level. Neutrons residing at this level are called thermal neutrons ($<0.025$ eV). They are still colliding, but the net energy transfer is zero. Thermal neutrons meander by means of thermal diffusion and continue for a period of time which depends upon the material in which they are diffused. The size of this neutron population will depend upon porosity and hydrogen content. Hydrogen dominates the neutron deceleration process due to its mass relative to that of a neutron. It is this neutron population which is detected by the compensated neutron instrument.

A pulsed neutron log is provided by the use of a pulsed neutron tool. The neutron source for this instrument is an electronic neutron generator. This source emits packets of high energy neutrons into the formation. These neutrons are then decelerated, by the process discussed above, and captured, releasing gamma radiation. These captured gamma rays are the input data used for computing porosity and water saturation. An estimate of water salinity is necessary for the computation of water saturation.

Both of these methods are effective. However, each requires a neutron moderating fluid in the borehole. The expense of filling the borehole with fluid coupled with extracting the fluid after the logs have been run, and returning the well to production, is often exorbitant. Consequently, many gas-injector fields go unmonitored.

SUMMARY OF THE INVENTION

A method for locating gas injected into subsurface oil-bearing formations behind oil well casing is disclosed wherein count rate data from a compensated neutron log is normalized to indicate water zones, gas zones and shale zones. The near count rate and the far count rate are plotted. Analysis of the discrepancy between the plot of the near count rate and the plot of the far count rate are compared to provide a qualitative determination of the distance from the point of injection to the top of the displaced gas in the formation. A standard compensated neutron instrument may be run in a gas-filled borehole to obtain the near count rate and the far count rate to monitor gas movement.

DESCRIPTION OF THE PREFERRED EMBODIMENT

Figure 1:
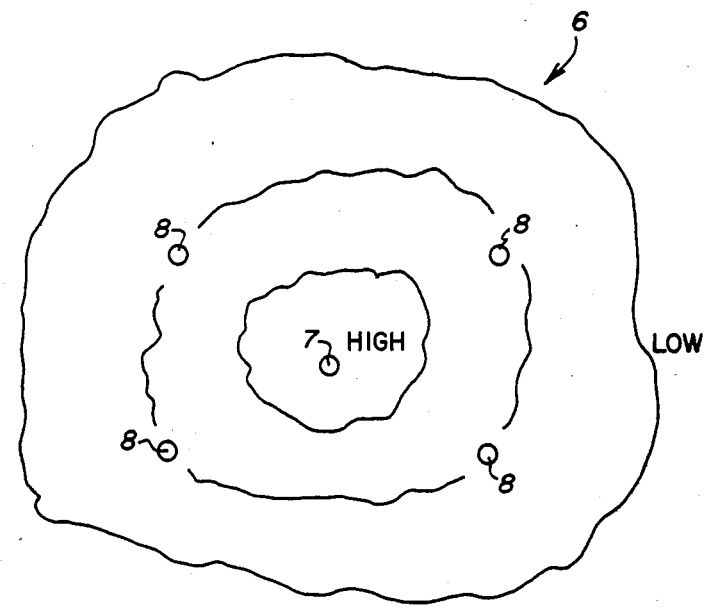
FIG. 1 is a plan view of the well layout in an oil field.

FIG. 1 illustrates a typical oil field 6 wellbore pattern. Located in the middle of the oil field is an injector well 7. Surrounding the injector well are the production wells 8. In operation, injection wells may be used to inject fluids, such as carbon dioxide or air, into the reservoir located in oil field 6. Production wells 8 are used to bring hydrocarbons to the surface. In the preferred embodiment, specific wells are designated as injection wells, and other specific wells are designated as production wells. However, any number of wells, as well as any specific well, may be used as a production well or injection well, or both production and injection well in an alternating matter.

Location of injected gas in an oil well may be accomplished by a review of neutron count rates.

The method of the present invention for determining the location of injected gas in an oil well requires obtaining a near count rate and a far count rate from a compensated neutron logging tool. The near count rate and the far count rates are scaled to readily permit a comparison of the two when they are plotted together. The location of the injected gas may be determined by identifying the depths where the near count rate differs from the far count rate by a predetermined amount.

In the preferred embodiment, the near count rate and the far count rate are scaled so that they overlay in a clean water zone. However, any scaling may be used and offset by the difference between the near count rate and the far count rate in a clean water zone.

With close inspection of the calculated water saturation and a visual inspection of the count rates, a detailed analysis can be offered and movement of gas behind pipe can be properly monitored.

Figure 2:
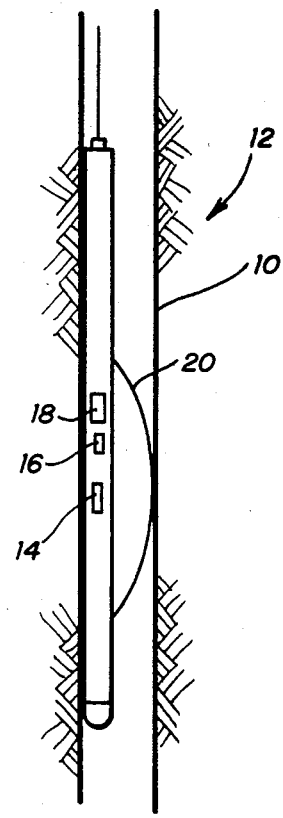
FIG. 2 is a side view of the operation of a neutron logging tool.

FIG. 2 illustrates a wellbore 10 in which a neutron logging tool 12 is in operation. Logging tool 12 emits neutrons from a neutron generator 14 which may be of any type neutron generator currently in use in the art. Emitted neutrons interact with nuclei in the formation. The type of interaction is dependent upon the molecular structure of the substance in the formation. Detectors 16 and 18 produce responses indicative of the "count rate" or frequency of interactions taking place in the formation for the area near logging tool 12 and for the area distant from logging tool 12, respectively. Bowspring 20 is illustrated as maintaining logging tool 12 against one side of wellbore 10. Bowspring 20 is used to eccenter logging tool 12 within wellbore 10 to provide consistent spacing between subsurface formations and neutron generator 14 with detectors 16 and 18 while minimizing travel distance of neutrons through borehole fluid.

The compensated neutron log is the most widely used neutron device today. Hi-count rate efficiency, due to the detection of thermal neutrons, improves the porosity resolution. The measurement, however, is affected by lithology and borehole effects. Elements with large cross-sections, such as chlorine and boron, will cause a decrease in neutron count rates. Since these decreases are not porosity related, thermal neutron data is often difficult to interpret.

The near and far count rates can be used to indicate gas in a formation for both the liquid-filled and gas-filled borehole. However, an estimate of porosity is not possible for the gas-filled case.

It is apparent, under favorable conditions, that the near and far count rates of the compensated neutron log can be used to locate light hydrocarbons in much the same manner as in pulsed-neutron interpretation. Most logging companies provide count rate data on magnetic tape recorded in the field. Open-hole neutron count rates serve as the base log for a gas monitoring program.

Figure 3:
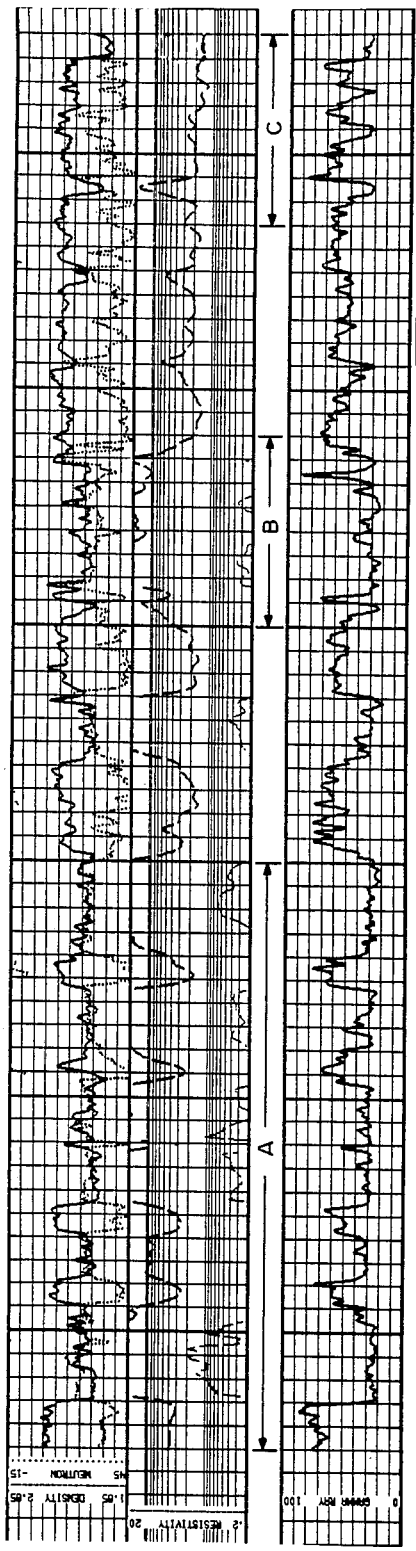
FIGS. 3 through 9 are graphical representations of neutron log data.

Referring now to FIG. 3, the open-hole method begins by zonation of the formation under investigation for lithology and porosity, such as zones A, B and C. It is essential that lithology and porosity be consistent throughout each zone.

In FIG. 3, the unscaled near count rate and the far count rate are illustrated. Similarities between the near count rate and the far count rate are correlated to determine a scaling factor.

Figure 4:
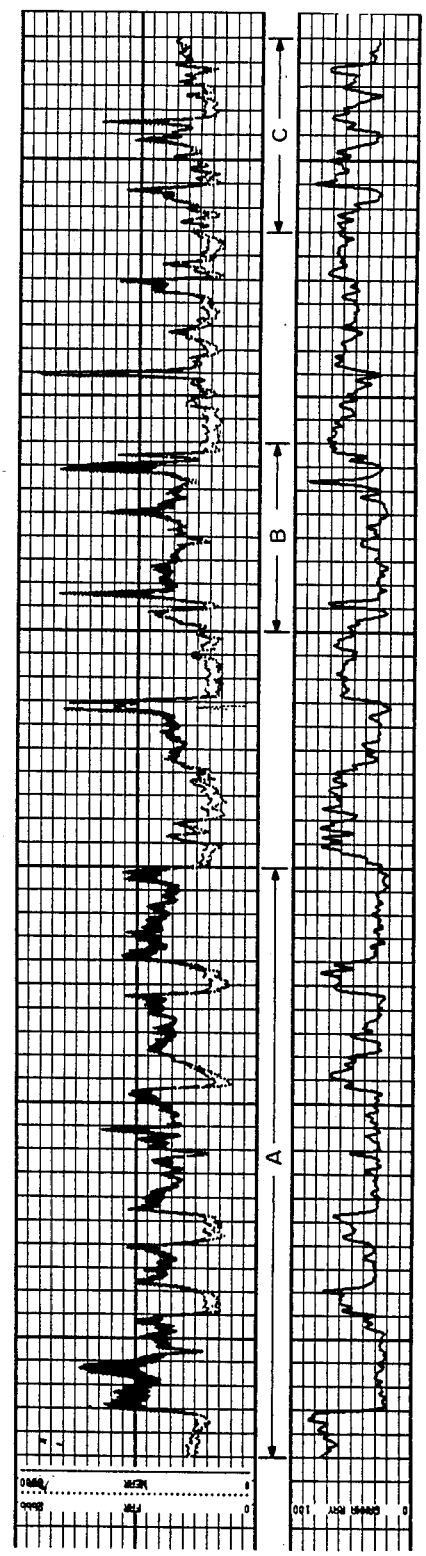

FIG. 4 illustrates the scaling of the logs of FIG. 3. The near and far count rate curves are scaled so that both overlay in a clean water zone. If no clean zone exist, a 3:1 ratio of near count rate to far count rate should be used. This ratio is illustrated in FIG. 4.

Figure 5:
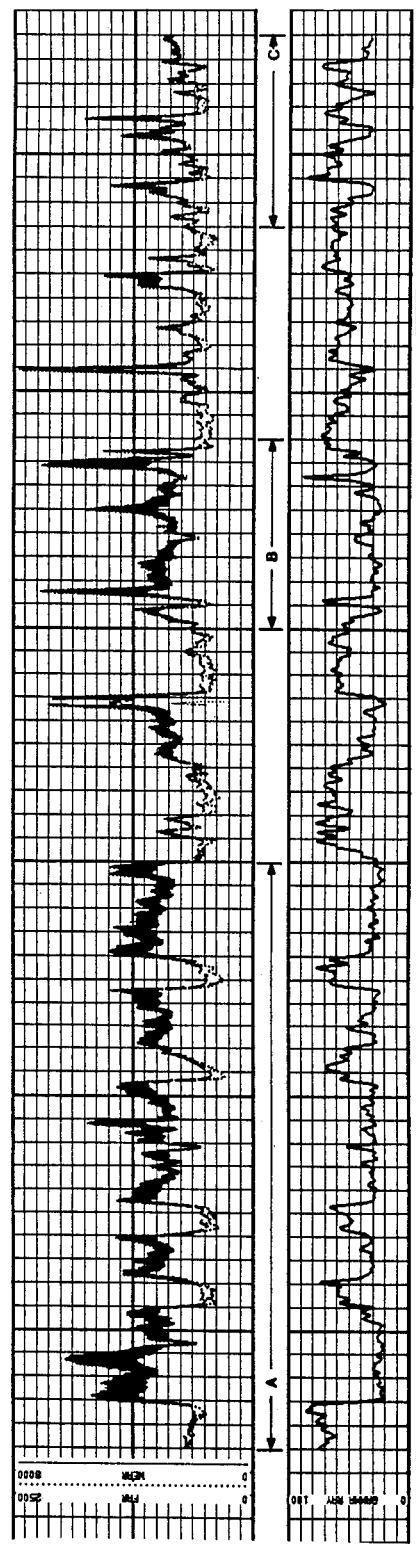

Once the scaling has been determined, and the count rates are plotted increasing to the top, gas, water, and/or shale zones will show distinctive patterns, as illustrated in FIG. 5. In FIG. 5, the near count rate and the far count rate overlay in clean water sand zones. Zone A is a gas sand, zone B is an oil sand, and zone C is a water sand.

When the near count rate curve and the far count rate curves are scaled, then values will plot in the following manner. In gas zones, the far count rate curve will plot above the near count rate curve. In clean oil zones, the far count rate curve will plot slightly above the near count rate curve. In clean water, the far and near counts overlay, and in shales, the far count rate curve plots below the near count rate curve. The amount of separation is indicative of the relative volumes of each. The far count rate detects greater neutron response from the formation than the near detector. The near is affected more by the borehole neutrons coming from the source. In shales, the neutron population will be depressed. The hydrogen content from the bound water and other elements with large neutron capture cross-sections are responsible for this decrease. In gas, the neutron population will increase. The far count rate will "see" more of the formation than the near count rate. Distances from the source appear to be a reasonable explanation for this anomaly.

Figure 6:
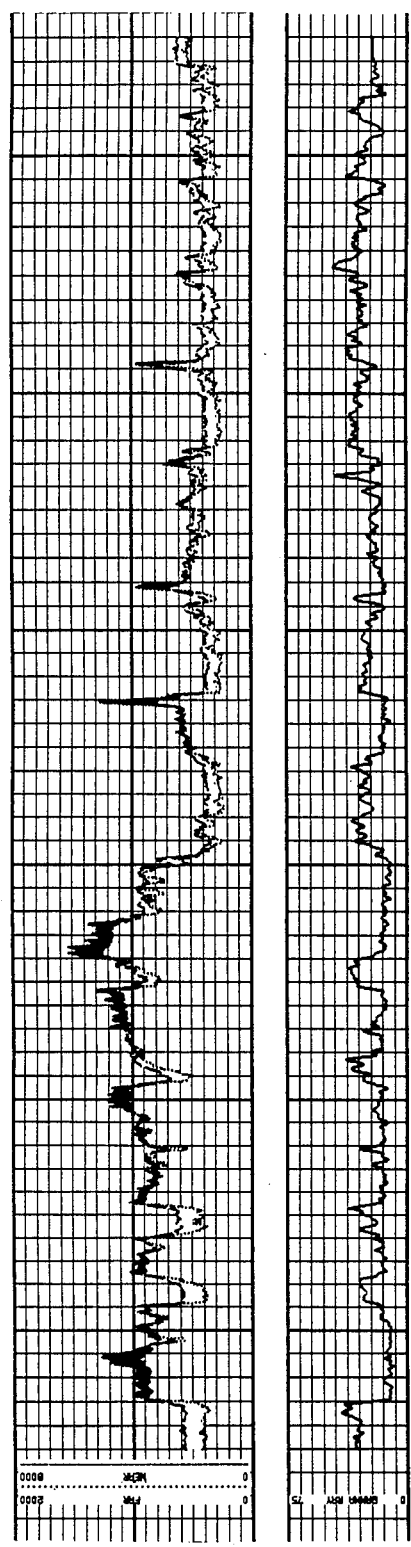
Figure 7:
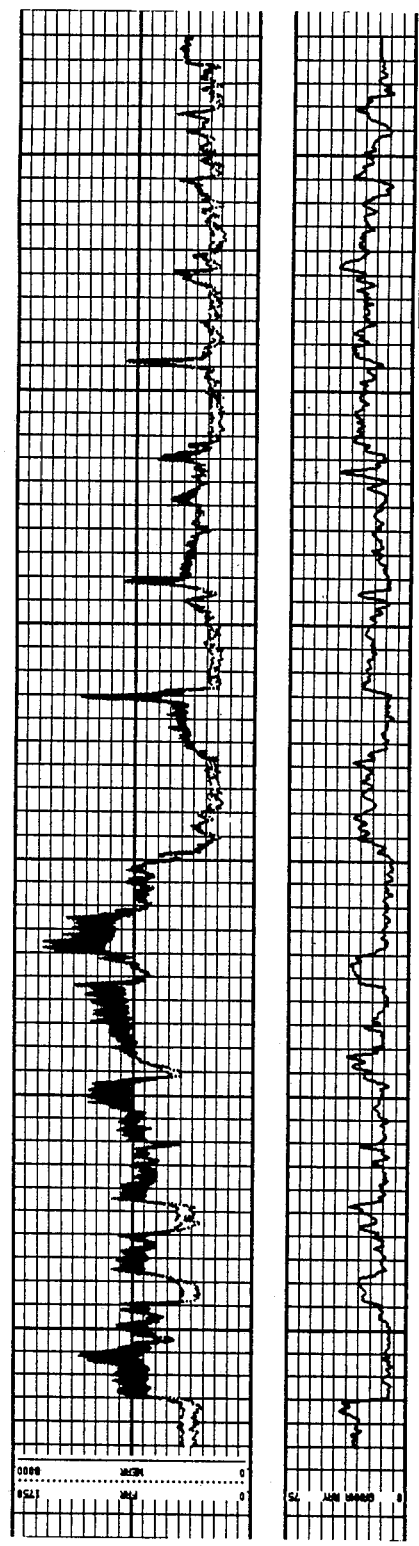

An analysis of cased hole count rate may be performed. Utilizing the physical separation of shales, as observed on the open-hole base log, cased-hole counts are normalized to show the identical physical separation. As illustrated in FIG. 6, a 4:1 ratio of near count rate to far count rate serves as a starting point for the normalizaton process for the fluid-filled case. In FIG. 7, the ratio of the near count rate to far count rate is adjusted to a greater than 4:1 ratio so that the qualitative separation in shales overlay the exact open hole count rate separation.

Figure 8:
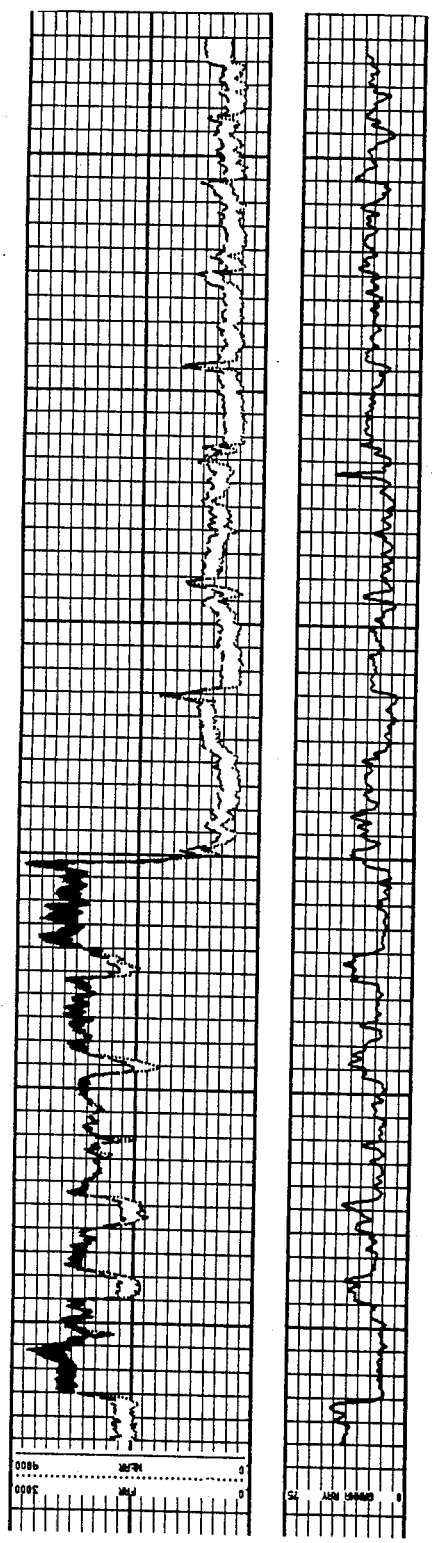

As illustrated in FIG. 8, 3:1 ratio of near-to-far is used for the gas-filled case. Again, normalization is done in shales since they are not likely to be altered by the injected gas.

Figure 9:
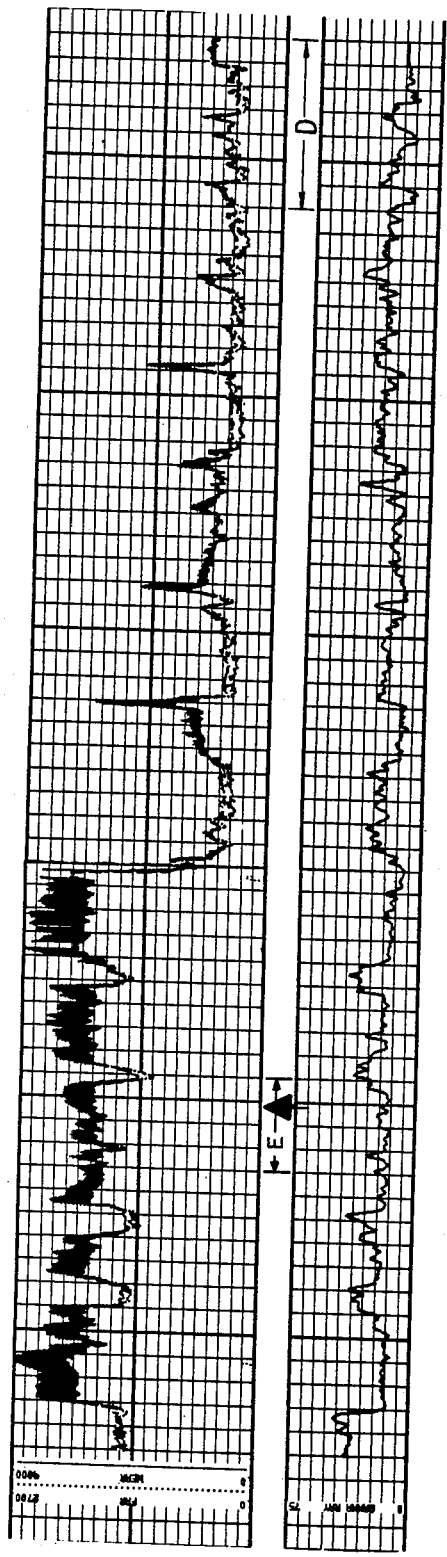

FIG. 9 illustrates the near count rate and far count rate curves after normalization has been done. The ratio of near count rate to far count rate has been modified to be slightly greater than 3:1. After normalization, the near and far count rate curves overlay in the clean water and/or oil zones, as illustrated in zone D.

In zones where gas has not migrated, the relative separations of near-to-far should be the same as the open-hole base log.

In zones where the relative separation of the near and far curves have increased when compared to the open hole log, it is assumed that the injected gas has moved into these zones as illustrated in FIG. 9, zone E. The height (distance) of the moved gas can be easily determined if the perforated interval in which the gas is being injected is known.

This normalization procedure can be used for both the liquid- or gas-filled cased-borehole.

In the present invention, near count rate data and far count rate data are obtained from a neutron logging tool. The curves defined by the near count rate and far count rate are plotted. These curves are scaled and normalized to overlay in preselected zones when the scaled and normalized curves are plotted on a display. By noting the value of the difference between the scaled and normalized near count rate curve and the scaled and normalized far count rate curve, a determination of the location of gas zones may be obtained. In gas zones, the scaled and normalized far count rate exceeds the scaled and normalized near count rate. In oil zones, the scaled and normalized far count is only slightly greater than the scaled and normalized near count rate. In clean water zones, the scaled and normalized near count rate and far count rate overlap. In shale zones, the scaled and normalized far count rate is less than the scaled and normalized near count rate. Thus, a gas zone may be identified. In a gas injection secondary or tertiary recovery process, an increase in a gas zone or the creation of a new gas zone must be caused by the migration of injected gas.

While the present invention has been explained by way of a preferred embodiment, it is to be understood as not limited thereto, but only by the scope of the following claims.

I claim:

1. A method for determining the location of injected gas in an oil well comprising the steps of:

obtaining data representing a near count rate from a compensated neutron logging tool;

obtaining data representing a far count rate from a compensated neutron logging tool;

scaling said near count rate and said far count rate;

plotting said scaled near count rate and said scaled far count rate;

comparing said scaled near count rate plot and said scaled far count rate plot; and determining the location of injected gas whenever said plot of said scaled near count rate and said plot of said scaled far count rate differ by a predetermined factor;

obtaining data representing a second near count rate from a compensated neutron logging tool at a second time;

obtaining data representing a second far count rate from a compensated neutron logging tool at said second time;

scaling said second near count rate and said second far count rate;

plotting said scaled second near count rate and said scaled second far count rate;

comparing said scaled second near count rate plot and said scaled second far count rate plot;

determining a second location of injected gas whenever said plot of said scaled second near count rate and said plot of said scaled second far count rate differ by a predetermined factor; and determining the migration of said injected gas by comparing said location with said second location.

* * * * *